US009797673B2

(12) United States Patent
Gutierrez (10) Patent No.: US 9,797,673 B2
(45) Date of Patent: Oct. 24, 2017

(54) WINDOW-MOUNT FIREARM REST

(71) Applicant: Tommy J Gutierrez, Grandview, TX (US)

(72) Inventor: Tommy J Gutierrez, Grandview, TX (US)

( * ) Notice: Subject to any disclaimer, the term of this patent is extended or adjusted under 35 U.S.C. 154(b) by 0 days.

(21) Appl. No.: 15/283,155

(22) Filed: Sep. 30, 2016

(65) Prior Publication Data

US 2017/0191783 A1    Jul. 6, 2017

Related U.S. Application Data

(60) Provisional application No. 62/274,228, filed on Jan. 1, 2016.

(51) Int. Cl.
*F41A 31/00* (2006.01)
*F41A 23/06* (2006.01)
*F16M 13/02* (2006.01)

(52) U.S. Cl.
CPC ............ *F41A 23/06* (2013.01); *F16M 13/022* (2013.01)

(58) Field of Classification Search
CPC ....................................................... F41A 23/06
See application file for complete search history.

(56) References Cited

U.S. PATENT DOCUMENTS

| | | |
|---|---|---|
| 1,195,055 A | 8/1916 | McNeal |
| 1,233,638 A | 7/1917 | Baerman |
| 4,026,057 A | 5/1977 | Cady |
| 4,854,066 A | 8/1989 | Canterbury, Sr. |
| 4,876,814 A | 10/1989 | Lombardo |
| 4,924,616 A | 5/1990 | Bell |
| 5,070,636 A | 12/1991 | Mueller |
| 5,081,783 A | 1/1992 | Jarvis |
| 5,173,563 A | 12/1992 | Gray |
| 5,481,817 A | 1/1996 | Parker |
| 5,755,411 A | 5/1998 | Strong, III et al. |
| 5,778,589 A | 7/1998 | Teague |
| 5,811,720 A | 9/1998 | Quinnell et al. |
| 5,964,435 A | 10/1999 | Peltier |

(Continued)

OTHER PUBLICATIONS

Deadshot ChairPod; http://www.btibrands.com/product/deadshot-chairpod/.

(Continued)

*Primary Examiner* — Gabriel Klein
(74) *Attorney, Agent, or Firm* — Lightfoot & Alford PLLC (57) ABSTRACT

An apparatus for supporting a firearm adjacent a window in a wall has an elongate member pivotably coupled to a pivot member, allowing pivoting about a first pivot axis generally perpendicular to a longitudinal length of the elongate member. At least one mounting element is configured for engaging the wall and is pivotably coupled to pivot member to allow pivoting of the pivot member and elongate member together relative to the mounting element about a second pivot axis generally perpendicular to the first pivot axis and to the longitudinal length. A stop selectively limits pivoting of the elongate member about one of the axes, and a firearm support is coupled to the elongate member. During use, one of the axes is generally horizontal and the stop is configured to constrain pivoting of the elongate member about the generally horizontal axis for defining an elevation angle of the elongate member.

20 Claims, 10 Drawing Sheets

(56) References Cited

U.S. PATENT DOCUMENTS

| | | |
|---|---|---|
| 6,272,785 B1 | 8/2001 | Mika et al. |
| 6,338,218 B1 | 1/2002 | Hegler |
| 6,526,687 B1 | 3/2003 | Looney |
| 6,637,708 B1 | 10/2003 | Peterson |
| 7,086,192 B2 | 8/2006 | Deros |
| 7,188,445 B2 | 3/2007 | Lehman |
| 7,313,884 B2 | 1/2008 | Eddins |
| 7,356,960 B1 | 4/2008 | Knitt |
| 7,415,790 B1* | 8/2008 | Ruhland ............ F41A 23/20 42/94 |
| D605,246 S | 12/2009 | Hobbs |
| 7,770,319 B2 | 8/2010 | McDonald |
| 8,096,077 B1 | 1/2012 | Caywood |
| 8,215,049 B2* | 7/2012 | Schuchman ......... F41A 23/34 42/94 |
| 8,544,202 B2 | 10/2013 | Bastian, Jr. |
| 8,590,440 B2 | 11/2013 | Gallo |
| 9,163,893 B1 | 10/2015 | Gutierrez |
| 2002/0040544 A1 | 4/2002 | Muhlestein |
| 2004/0134113 A1 | 7/2004 | Deros et al. |
| 2006/0254114 A1* | 11/2006 | Lehman ............ F41A 23/16 42/94 |
| 2008/0047420 A1* | 2/2008 | Carroll, III ......... F41A 23/12 89/37.01 |
| 2008/0202326 A1 | 8/2008 | Carroll et al. |
| 2009/0026679 A1 | 1/2009 | Harman, III |
| 2009/0277068 A1 | 11/2009 | Lamar |
| 2010/0223832 A1 | 9/2010 | Lombardi |
| 2010/0301184 A1 | 12/2010 | Stabler |
| 2011/0094140 A1 | 4/2011 | Letson |
| 2011/0113670 A1 | 5/2011 | Stafford et al. |
| 2012/0017485 A1 | 1/2012 | Kern |
| 2012/0294672 A1 | 11/2012 | Hicks |
| 2014/0352193 A1 | 12/2014 | Bull |
| 2016/0298922 A1* | 10/2016 | Duncan ............ F41A 23/02 |

OTHER PUBLICATIONS

Deadshot FieldPod; http://www.btibrands.com/product/deadshot-fieldpod/.

Deadshot TreePod; http://www.btibrands.com/product/deadshot-treepod/.

* cited by examiner

WINDOW-MOUNT FIREARM REST

BACKGROUND

1. Field of the Invention

This disclosure relates in general to accessory equipment for firearms and in particular to a portable and adjustable apparatus for providing stable support.

2. Description of Related Art

Shooting game with a rifle relies substantially on the ability of the shooter to support the rifle in a steady or stable position to achieve maximum accuracy. The advantage of the long barrel of the rifle to align the trajectory of the projectile becomes a disadvantage if the rifle is not held in a fixed position after it is aimed at the target and while the trigger is squeezed to fire the round. It is often the case that resting a portion of the rifle on a fixed object such as a table, rock, or other stationary object enhances the ability to fire at a target with improved accuracy. For example, shooting from a blind that has a solid widow frame is one common example of such a fixed object. Other examples include a hunting stand railing, ledge, and the like. Nevertheless, the rifle when aimed must still be supported by the shooter in alignment with the target. This can be difficult for several reasons, such as strong winds, a rifle that is too heavy to hold steady (for instance, young shooters or shooters of small stature), nervousness, or a physical disability that impairs proper technique.

A number of efforts to provide stable support for a shooter's rifle in the window or other opening in a blind structure or similar context have been devised in the prior art. Several representative examples include U.S. Pat. No. 7,313,884 issued to Eddins, U.S. Pat. No. 7,188,445 issued to Lehman, and U.S. Pat. No. 5,964,435 issued to Peltier, all characterized by limited adjustment and adaptability to shooting environments, require the use of tools to make the adjustments, etc.

INCORPORATION BY REFERENCE

U.S. Pat. No. 9,163,893, titled "Adjustable Rifle Support" and issued to Tommy J. Gutierrez on 20 Oct. 2015, is incorporated herein by reference.

CROSS-REFERENCE TO RELATED APPLICATIONS

This disclosure claims the benefit of the filing date of U.S. Provisional Patent Application 62/274,228, titled "Window-Mount Firearm Rest" and filed 1 Jan. 2016, is incorporated herein by reference.

DETAILED DESCRIPTION

Illustrative embodiments of the subject matter of this disclosure are described below. All features of an actual implementation may not be described in this specification, and the development of any actual embodiment may include numerous implementation-specific decisions to achieve the developer's goals, which will vary from one implementation to another. Such development effort, though complex and time-consuming, would nevertheless be a routine undertaking for those of ordinary skill in the art having the benefit of this disclosure.

Reference may be made to the spatial relationships between various components and to the spatial orientation of components as both are depicted in the drawings. However, components (and assemblies of components) may be positioned in any appropriate location or orientation, and the descriptions should be understood to describe a relative relationship between the components or a relative spatial orientation.

A window-mount firearm rest has a number of advantages, including the ability to conveniently be installed, support, and adjust the position of the firearm without tools, while sighting the firearm in alignment with the intended target. Easy-to-use adjusters permit easy, rapid, and quiet adjustments to be made to the elevation of the firearm. Once installed and the firearm is in position ready to shoot, these advantages further include (1) the firearm is retained in a shooting position; (2) the shooter does not have to support the weight of the firearm when making the shot; (3) adjustments can easily be made by the shooter without taking his or her eyes off the target; (4) the range of adjustments includes a substantial horizontal swing in the azimuth, either to improve the aim of the firearm or to gain more room inside a blind; (5) preferably both ends of the firearm are supported in respective components that may be independently adjustable; (6) the firearm is well-secured in the rest; and (7) some embodiments may react recoil forces when the firearm is fired. As with any firearm supporting structure, it is best practice to ensure that the safety is in an ON position when making adjustments and until ready to shoot.

Though the rest is described in relation to use as a firearm rest, the rest may be used to support other devices that fire projectiles, such as, for example, crossbows and air rifles. Therefore, the term "firearm," as used herein, should be understood to cover these other devices unless stated otherwise or clearly obvious from the context. Also, the rest may be used to support other items requiring a steady platform, such as lights, cameras, binoculars, or spotting scopes, and these devices may be supported using firearm supports or by using supports configured for specific devices.

FIGS. 1 through 12 show the configuration and use of an embodiment of a window-mount firearm rest 11 according to this disclosure. Rest 11 includes three main parts, including: an elongate member 13 having a longitudinal length; a pivot member 15 pivotably coupled to the forward portion of elongate member 13; and a mounting system 17 coupled to pivot member 15. Elongate member 13 preferably comprises an extendable rigid-bar assembly of forward tube 19 and rear tube 21, member 13 having an extended length equal to at least a substantial portion of the length of the longest firearm to be supported by rest 11. When installed in a typical hunting blind or similar structure, the longitudinal length of both elongate member 13 and the firearm are preferably positioned in a substantially horizontal orientation, though rest 11 can be installed or adjusted to provide a desired elevation angle to elongate member 13 and the firearm. This elevation angle may be necessary for pointing the firearm downward, such as may be required from an elevated stand or to aim downhill, or upward, such as for aiming uphill or toward the sky.

Figure 1:
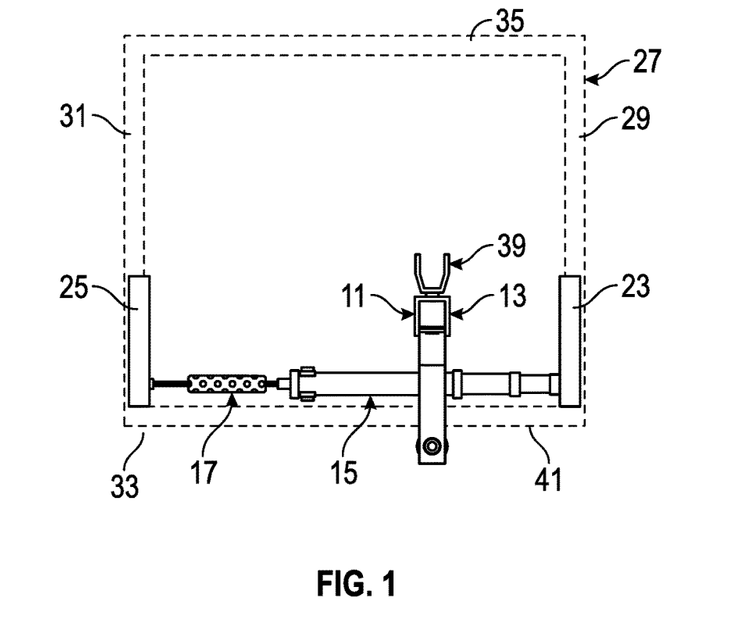
FIG. 1 is a rear end view of a window-mount firearm rest according to this disclosure, the rest being shown in a horizontal orientation and configuration.
Figure 2:
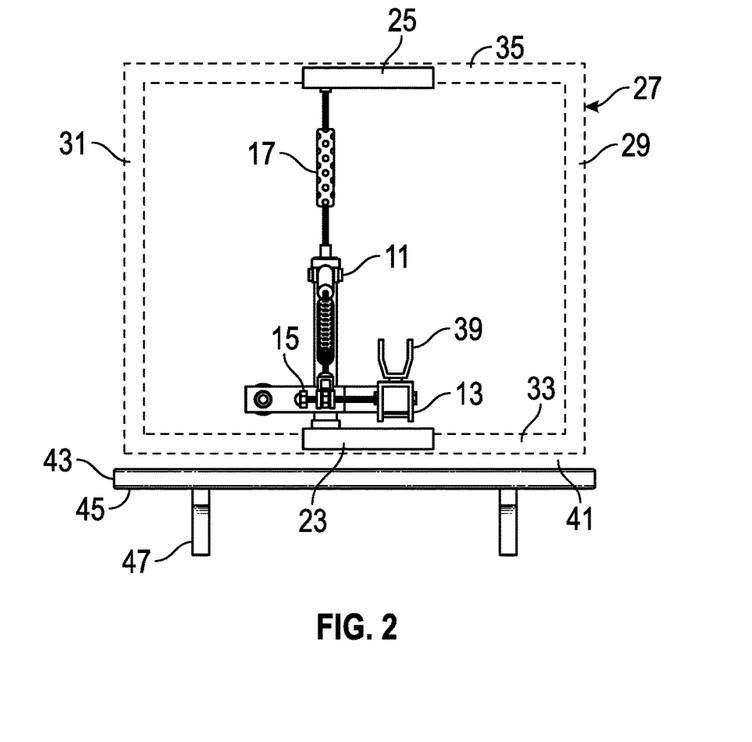
FIG. 2 is a rear end view of the rest of FIG. 1, the rest being shown in a vertical orientation and configuration.

Mounting system 17 has mounting elements, such as opposed mounts 23, 25, for engaging parts of a wall or opening in a wall, such as window 27. In the embodiment shown, mounts 23, 25 engage opposing sides 29, 31 or 33, 35 of window 27. At least one firearm support 37, 39 is coupled to or integral with elongate member 13 and configured for selective positioning along the longitudinal length of member 13. Each firearm support 37, 39 may optionally be adjustable for elevation relative to elongate member 13, allowing for use with various types of firearms. Components of rest 11 are preferably formed from a metal or polymer having appropriate rigidity and strength to support the combined weight of rest 11 and a firearm carried by rest 11. In addition, rest 11 should be formed to have sufficient strength and stiffness to resist any downward force applied as a shooter aligns and fires the firearm and, in the appropriate embodiments, react recoil forces exerted from discharging the firearm.

FIGS. 1 and 2 show use of window-mount rest 11 in horizontal and vertical orientations, respectively. Both orientations are available for use with a wall or opening in a wall, like window 27 in wall 41, which may be, for example, a wall of a hunting blind. Window 27 may simply be a rectangular hole formed in wall 41, or window 27 may be a framed opening with or without a sliding, swinging, or otherwise removable or repositionable pane, such as a plastic or glass pane. As shown, mounts 23, 25 engage one of two pairs of opposing sides 29, 31 or 33, 35 of rectangular window 27, though mounts 23, 25 may be used to engage sides of a window having an alternative number of generally opposing sides, and mounts 23, 25 may be used with generally diametrically opposed sides of a circular or other type of curved-side window. In addition to sides of windows, mounts may also be used to engage bars, adjacent walls, adjacent ends of walls, or components of a fence or other structure.

As shown in FIG. 2, use of rest 11 in the vertical orientation may be necessary when a protrusion, such as a window ledge or shelf 43, extends from the interior of wall 41 below window 27. Shelf 43 comprises a planar top 45 supported by two brackets 47, and the location of shelf 43 immediately below window 27 can interfere with the installation and or operation of rest 11 in the horizontal orientation.

When installed in either the horizontal or vertical orientation, the longitudinal length of both elongate member 13 and the firearm are typically positioned in a substantially horizontal orientation, though rest 11 may be installed or adjusted to provide for a substantial elevation angle. Both horizontal and vertical orientations allow for fine adjustability of the elevation angle of elongate member 13 and the supported firearm through adjustment of a stop, and both also provide for free rotation of elongate member 13 relative to window 27. This motion of elongate member 13 is relative to pivot member 15 about a pivot axis or together with pivot member 15 and relative to mounts 23, 25 about another pivot axis perpendicular to the other pivot axis.

Figure 3:
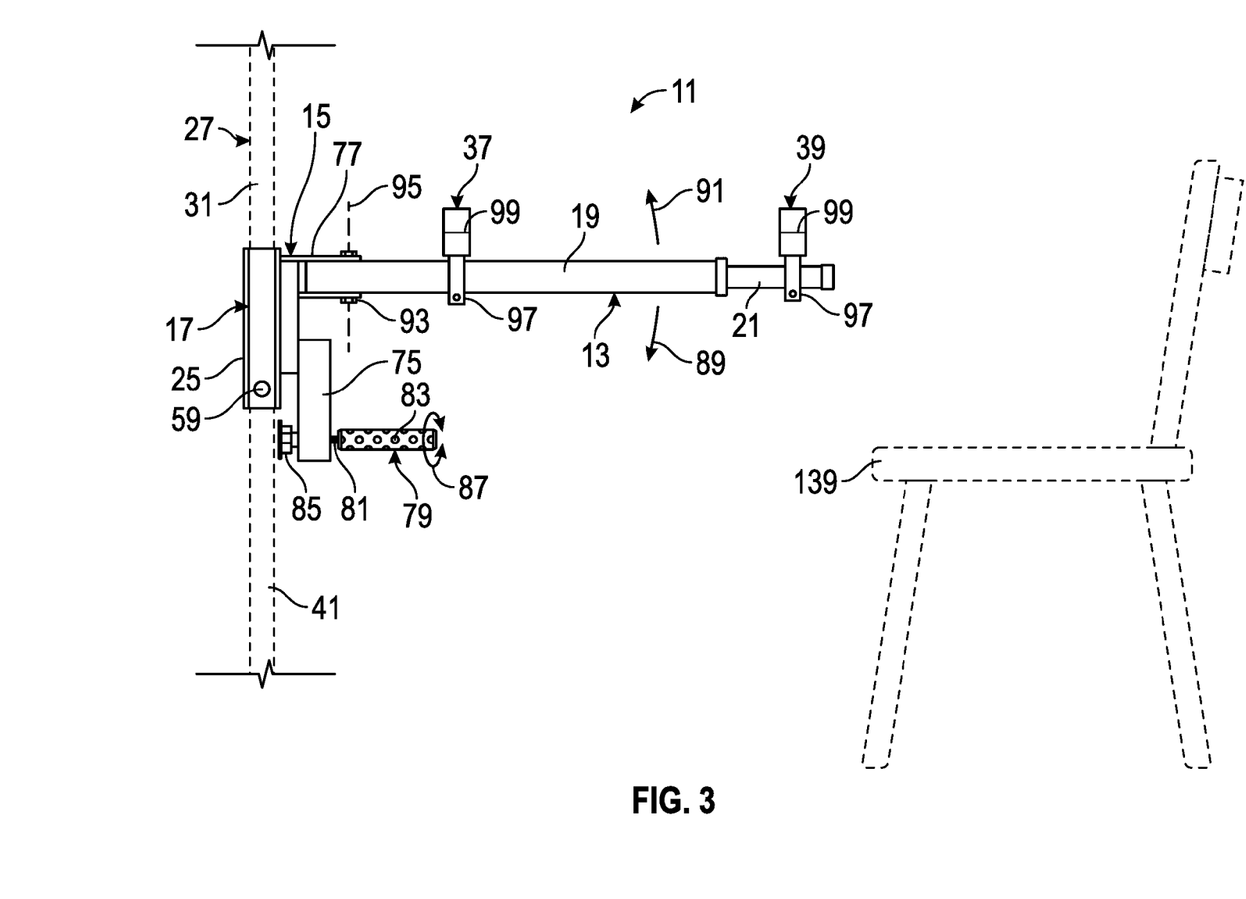
FIG. 3 is a side view of the rest of FIG. 1 in the horizontal orientation.
Figure 4:
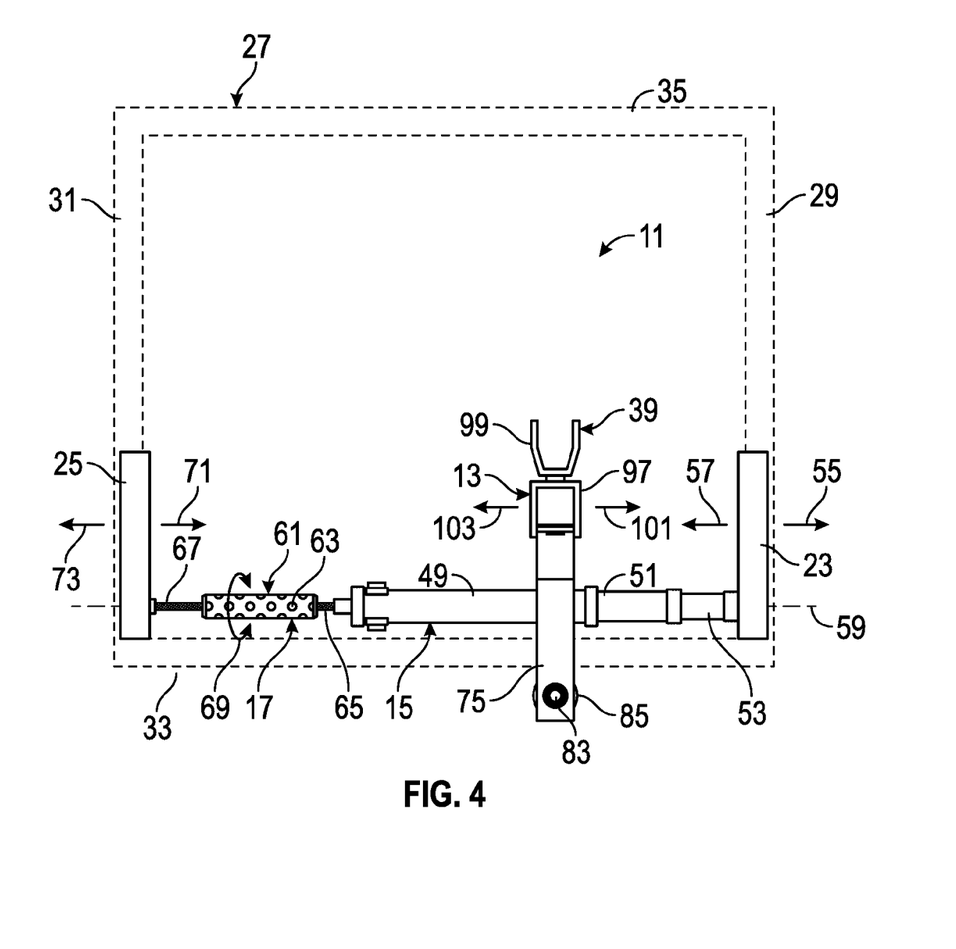
FIG. 4 is a rear end view of the rest of FIG. 1 in the horizontal orientation.
Figure 5:
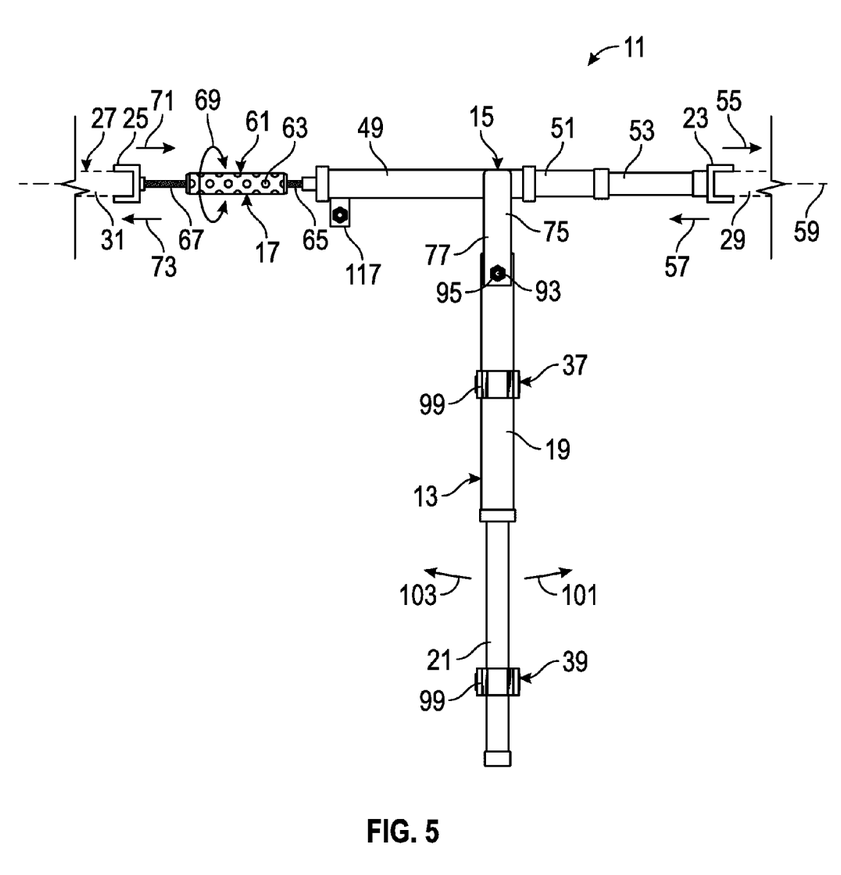
FIG. 5 is a top view of the rest of FIG. 1 in the horizontal orientation.

FIGS. 3, 4, and 5 illustrate side, rear end, and top views, respectively, of rest 11 mounted in window 27 in the horizontal orientation. To secure rest 11 in window 27, mounting system 17 is used to position mounts 23, 25 adjacent sides 29, 31 and then apply force for securing U-shaped mounts 23, 25 to sides 29, 31. In the embodiment shown, mounting system 17 comprises several components, including a central tube 49 that is fixedly coupled to pivot member 15. One end of tube 49 carries a set of extendable nested tubes 51, 53. Nested tubes 51, 53 are selectively extendable into and out of central tube 49, and nested tubes 51, 53 preferably have one or more locks or detents (not shown) for retaining tubes 51, 53 in the selected position. Changing the extension length of nested tubes 51, 53 changes the distance of mount 23 from central tube 49, as indicated by arrows 55, 57. Mount 23 is pivotably coupled to nested tube 53, allowing for rotation of tubes 49, 51, 53 and pivot member 15 (together with elongate member 13) relative to mount 23 about a generally horizontal pivot axis 59. Alternatively, nested tubes 51, 53 may be removed, and mount 23 may be pivotably coupled directly to tube 49 for use with narrow windows.

On the opposite side of pivot member 15 from mount 23, mount 25 is coupled to central tube 49 by a width adjuster, such as turnbuckle 61. Though shown as a turnbuckle, the width adjuster may be of any appropriate style, including, for example, tripod-style lever locks, twist locks, or other types of adjusters. Turnbuckle 61 comprises a coupling nut 63 threadingly coupled to two threaded rods 65, 67. Rod 65 is fixedly coupled to central tube 49, and rod 67 is fixedly coupled to mount 25. This allows for rotation of coupling nut 63, shown by arrow 69, to change the distance of mount 25 from tube 49, as indicated by arrows 71, 73. Turnbuckle 61 is coaxial with pivot axis 59, and turnbuckle 61 allows for rotation of tubes 49, 51, 53 and pivot member 15 (together with elongate member 13) relative to mount 25 about pivot axis 59.

In other embodiments, a second turnbuckle, similar in construction and operation to turnbuckle 61, is installed in place of extendable nested tubes 51, 53, allowing for width adjustment by rotating both turnbuckles. The second turnbuckle would be coaxial with turnbuckle 61 and pivot axis 59 and allow for rotation of tubes 49, 51, 53 and pivot member 15 (together with elongate member 13) relative to mount 23 about pivot axis 59. Also, interchangeable turnbuckles 61 and/or nested tubes 51, 53 of differing maximum or minimum lengths may be provided, allowing for a user to select an appropriate length combination for a specific installation location.

In the embodiment shown, mounting system 17 comprises mounts 23, 25, central tube 49, nested tubes 51, 53, and turnbuckle 61. During installation of firearm rest 11, mounting system 17 is operated to move mounts 23, 25 in opposite outward directions to engage the sides of a window. In this embodiment, mount 23 is positioned with tubes 51, 53 at a selected distance from tube 49, and then turnbuckle coupling nut 61 is rotated to move mount 25 outward for applying pressure to mounts 23, 25 for securing mounts 23, 25 to window 27. To uninstall rest 11, coupling nut 61 is rotated in the opposite direction to move mount 25 inward and release pressure from mounts 23, 25, allowing for removal of rest 11 from window 27.

Pivot member 15 acts as an intermediate component that couples mounting system 17 and elongate member 13 and, in this embodiment, provides a stop for selectively limiting rotation of pivot member 15 and elongate member 13 about pivot axis 59. In the embodiment shown, pivot member 15 has a transverse member 75 fixedly coupled to central tube 49 and formed from two offset pieces. Alternatively, member 75 may be formed as one piece or from any number of pieces. One end of pivot member 15 has a clevis 77, and the other end of member 75 has an adjustable threaded stop 79. Stop 79 comprises a threaded rod 81 threadingly engaging transverse member 75. A handle 83 is fixedly coupled to one end of rod 81, and a pad 85 is rotatably coupled to the other end of rod 81. This configuration allows for rod 81 to be rotated, as shown by arrow 87, with handle 83 relative to member 75, thereby changing the distance of pad 85 from the lower end of member 75. Pad 85 is configured to be in contact with wall 41 below axis 59 and window 27, and this contact constrains downward rotation of pivot member 15 and attached elongate member 13 about pivot axis 59 in the direction shown by arrow 89. The weight of elongate member 13 and the supported firearm forces pad 85 against wall 41, thus rotation of stop 79 adjusts the angle of pivot member 15 and the elevation angle of elongate member 13 about axis 59 and relative to wall 41 and window 27 in the directions shown by arrows 89, 91.

As described above, elongate member 13 is pivotably coupled to pivot member 15. In the embodiment shown, a pin 93 extends through clevis 77 and a forward portion of tube 19 of elongate member 13. Pin 93 and clevis 77 cooperate to define a pivot axis 95 about which elongate member 13 is pivotable relative to pivot member 15. Pivot axis 95 is generally perpendicular to pivot axis 59 and to the longitudinal length of elongate member 13.

Elongate member 13, as described above, preferably comprises forward tube 19 and extendable rear tube 21, though member 13 may alternatively be formed as a single piece. Tube 21 may be selectively extended relative to tube 19 to accommodate the various lengths of firearms or other supported objects, and tube 19 preferably has one or more locks or detents (not shown) for retaining tube 21 in the selected extended position. To support a firearm or other object on member 13, a front firearm support 37 and rear firearm support 39 are installed on tubes 19, 21 or formed as integral portions on member 13. Each support 37, 39 is typically of similar construction, and supports 37, 39 for a particular embodiment may be identical. In the embodiment shown, supports 37, 39 each have a collar 97 and an upward-opening saddle 99 for supporting a portion of a firearm or other type of object. Each collar 97 is configured and sized to receive or otherwise be coupled to one of tubes 19, 21 of elongate member 13. In the preferred embodiment, supports 37, 39 slidingly receive tubes 19, 21, and collars 97 are selectively tightened to affix each support 37, 39 in a desired location along the longitudinal length of elongate member 13.

When rest 11 is installed in the horizontal orientation, elongate member 13 is free to rotate relative to pivot member 15 and window 27 about pivot axis 95. As shown, this motion is in a generally horizontal plane, as indicated by arrows 101, 103.

Figure 6:
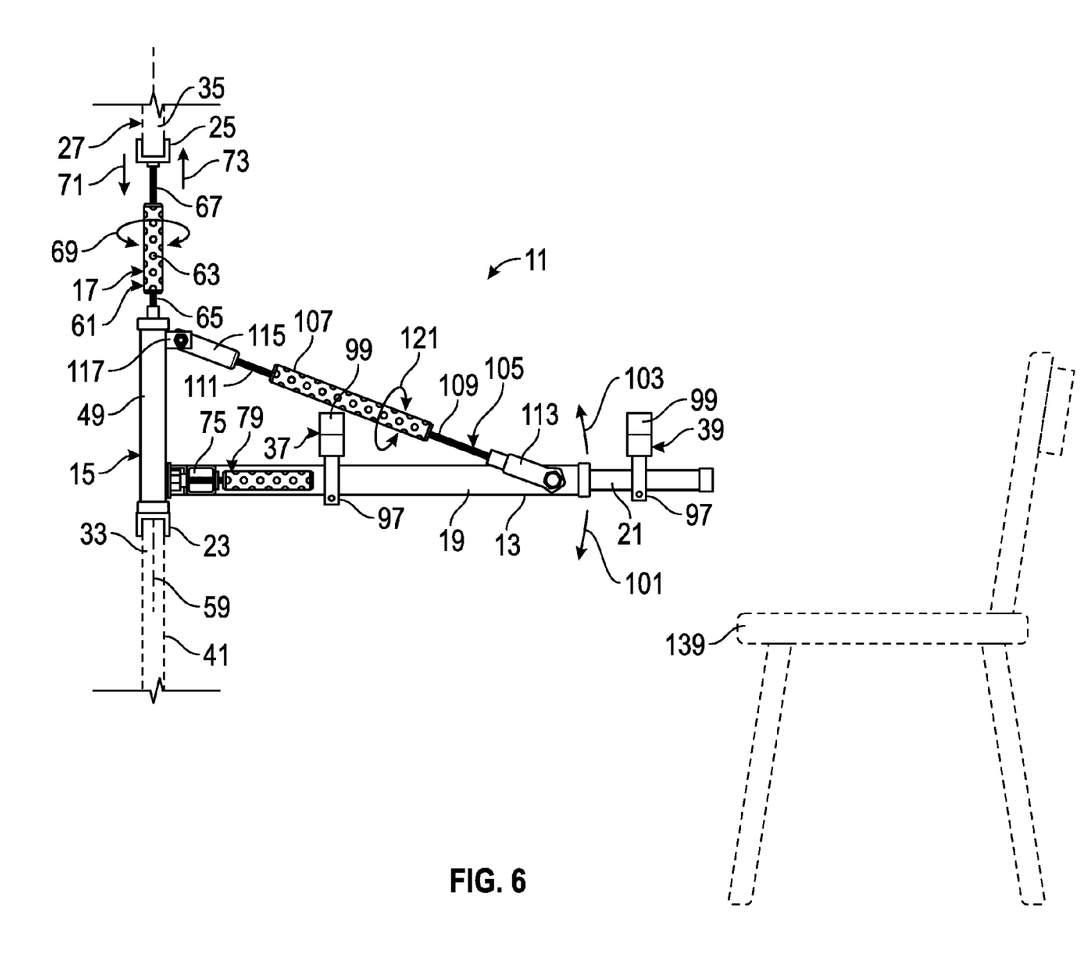
FIG. 6 is a side view of the rest of FIG. 1 in the vertical orientation.
Figure 7:
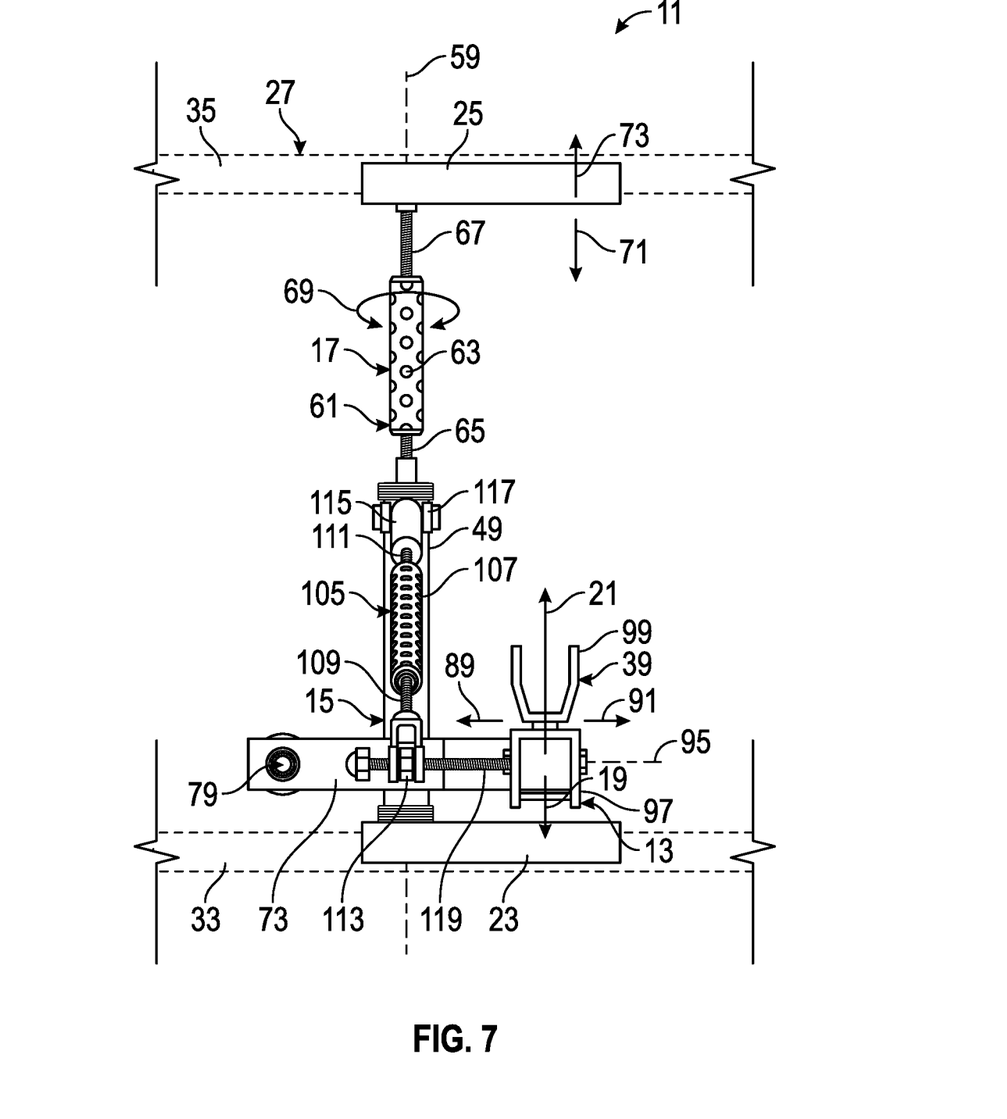
FIG. 7 is a rear end view of the rest of FIG. 1 in the vertical orientation.
Figure 8:
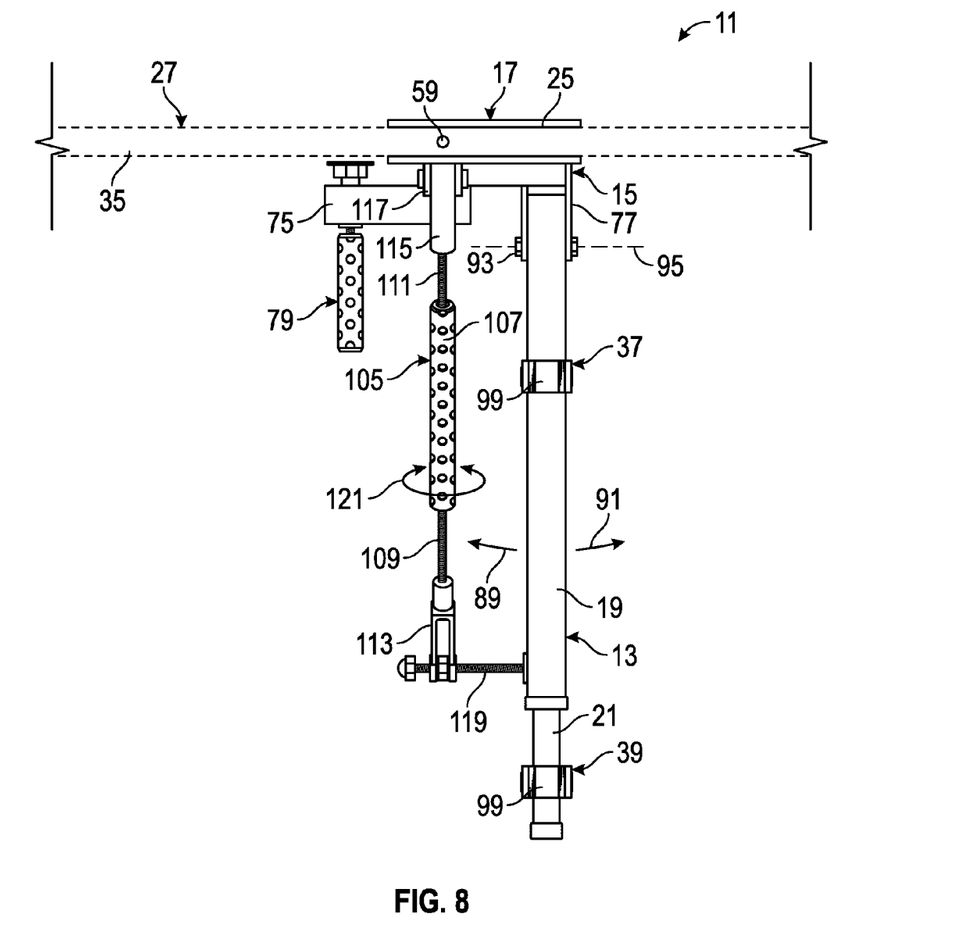
FIG. 8 is a top view of the rest of FIG. 1 in the vertical orientation.

FIGS. 6, 7, and 8 illustrate side, rear end, and top views, respectively, of rest 11 mounted in window 27 in the vertical orientation, with rest 11 rotated 90 degrees from the horizontal orientation. To secure rest 11 in window 27, mounting system 17 is used to position mounts 23, 25 adjacent sides 33, 35 and then apply force for securing U-shaped mounts 23, 25 to sides 33, 35. The vertical orientation of rest 11 also reorients pivot axes 59, 95, so that, as shown, pivot axis 59 is generally vertical and pivot axis 95 is generally horizontal. In this configuration, transverse member 75 and stop 79 are positioned above lower side 33 of window 27, allowing elongate member 13 and pivot member 15 to freely rotate together relative to mounts 23, 25 and window 27 about pivot axis 59. Thus, elongate member 13 and the supported firearm rotate in a generally horizontal plane, as indicated by arrows 89, 91. It should be noted that the position of elongate member as being offset from central tube 49 allows for a firearm supported by elongate member 13 to extend beside and past central tube 49 when rest 11 is used in the vertical orientation.

To provide for constrained and selected angular positioning of elongate member 13 about pivot axis 95 in the directions of arrows 101, 103, a stop, such as adjustable link 105, couples tube 19 of elongate member 13 to central tube 49 of mounting system 17. In the embodiment shown, link 105 has a turnbuckle configuration, with coupling nut 107 threadingly engaging threaded rods 109, 111, which in turn are coupled to tabs 113, 115. As described for turnbuckle 61, alternative adjusters may be used in place of a turnbuckle, including, for example, lever lock and twist lock adjusters. To couple tube 19 to tube 49, tab 115 is pivotably coupled to a clevis 117 on the interior side of central tube 49, and tab 113 is pivotably coupled to a rod 119 installed in and extending from tube 19. This configuration allows for adjustability of the elevation angle of elongate member 13 and the supported firearm by rotating coupling nut 107, as indicated by arrow 121, to change the distance between tabs 113, 115. This causes selective rotation of elongate member 13 relative to pivot member 15 about pivot axis 95 and in the directions shown by arrows 101, 103.

To support a firearm or other object on member 13, firearm supports 37, 39 are installed on tubes 19, 21 in an orientation 90 degrees from that shown for the horizontal orientation of rest 11, with saddles 99 opening upward. Supports 37, 39 are then moved to selected positions along the length of tubes 19, 21 before tightening collars 97.

Though shown as having fixed heights and having saddles 99 centered over elongate member 13, supports 37, 39 may have other configurations. Supports 37, 39 may be adjustable for height to accommodate a variety of arms or objects, and supports 37, 39 may have height adjusters of any appropriate type, such as, for example, rack-and-pinion or friction lock. Also, instead of positioning saddles 99 of supports 37, 39 directly over elongate member 13, fixed-height or adjustable-height supports 37, 39 may be configured as offset to the side of elongate member 13. In addition, supports 37, 39 may include features allowing for each to be folded, rotated, or otherwise collapsed, retracted, or stowed while installed on elongate member 13 but not in use.

Figure 9:
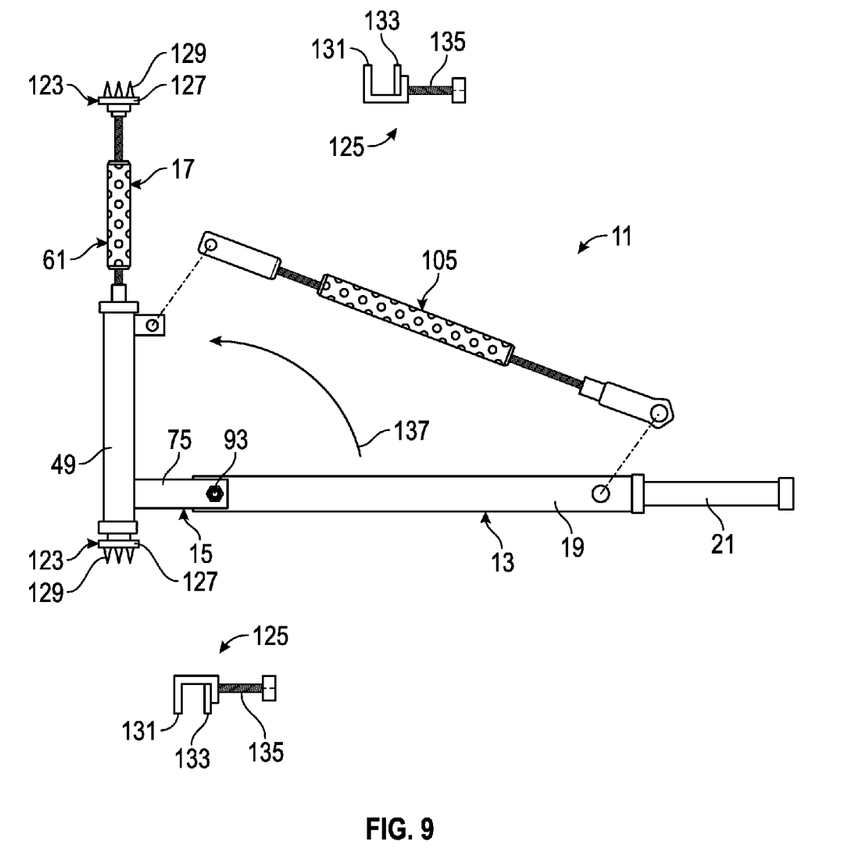
FIG. 9 is a side view of the rest of FIG. 1, showing removable and optional components, some components being omitted for ease of viewing.

FIG. 9 shows firearm rest 11 with some details omitted for ease of viewing. For use with a window having sides thicker than those that can be accommodated by mounts 23, 25, optional wood mounts 123 and clamp mounts 125 may alternatively be used in place of mounts 23, 25. Wood mounts 123, shown installed on rest 11, comprise a rigid plate 127 and protrusions, such as rigid spikes 129, extending from plate 127. Wood mounts 123 may be used on window sides formed from soft, compressible materials, such as wood, with spikes 129 compressing or piercing the material to form a secure coupling for anchoring rest 11 to the window. Clamp mounts 125 comprise a fixed plate 131, a movable plate 133, and an adjuster, such as threaded adjuster 135, and clamp mounts 125 may alternatively be used in place of mounts 23, 25 or wood mounts 123 to accommodate window sides of various thickness.

Another advantage of rest 11 is that it is easily transported by removing, if installed, link 105 and rotating elongate member 13 in the direction shown by arrow 137 With tube 21 in a retracted position to make elongate member 13 the shortest allowable length, and with elongate member 13 rotated to a position alongside central tube 49 and turnbuckle 61, rest 11 is configured as a compact, easily carried package.

When installed, firearm rest 11 is configured to position elongate member 13 and the supported firearm at a height usable by a person sitting to the rear of rest 11. For example, FIGS. 3 and 6 show a chair 139, on which a shooter can sit and utilize rest 11 to position the supported firearm for aiming at a selected location. In the horizontal orientation, the shooter is free to pivot elongate member 13 about pivot axis 95 for azimuth, or windage, changes, and the shooter can adjust stop 79 for elevation angle changes. Likewise, in the vertical orientation, the shooter is free to pivot elongate member 13 together with pivot member 15 about pivot axis 59 for azimuth, or windage, changes, and the shooter can adjust link 79 for elevation angle changes.

Figure 10:
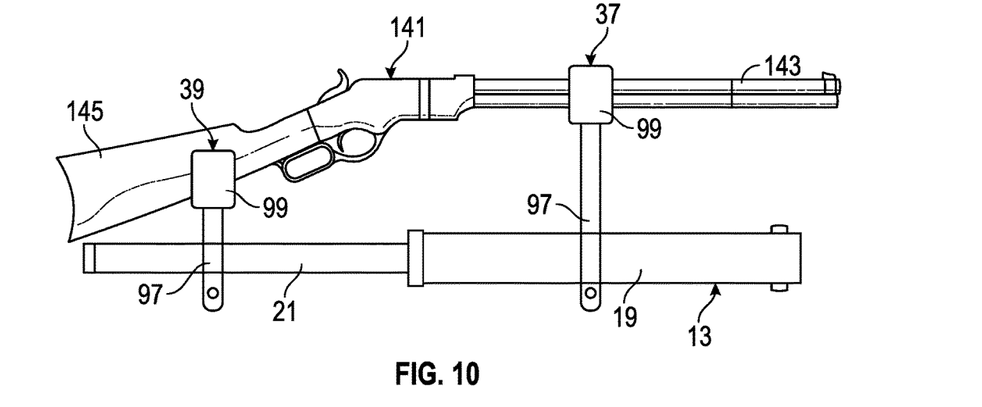
FIG. 10 is a side view of a portion of the rest of FIG. 1 in use with a long gun.
Figure 11:
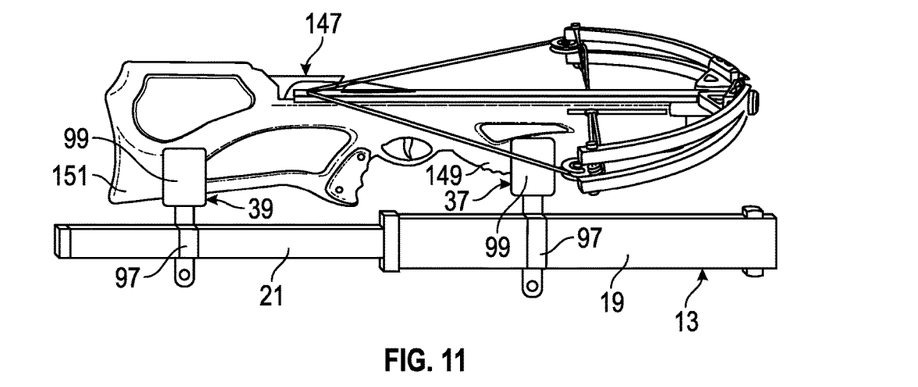
FIG. 11 is a side view of a portion of the rest of FIG. 1 in use with a crossbow.
Figure 12:
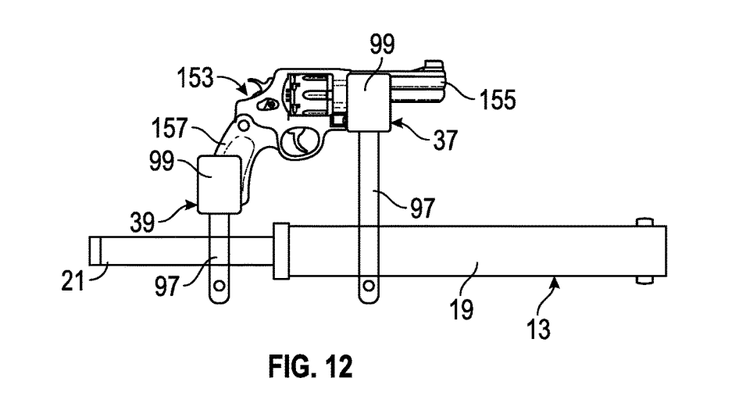
FIG. 12 is a side view of a portion of the rest of FIG. 1 in use with a handgun.

FIGS. 10 through 12 show examples of arms being supported by elongate member 13 and supports 37, 39, which may have a fixed height, as shown, or may be adjustable, as described above. FIG. 10 shows a long gun, such as rifle 141, with a barrel portion, or forend, 143 being supported by front support 37 and a buttstock portion 145 being supported by rear support 39. To accommodate the length of rifle 141, tube 21 is in an extended position, and support 39 is located rearward on tube 21. Likewise, a crossbow 147 is shown supported at forend 149 by support 37 and at buttstock 151 by support 39. Rest 11 is also capable of supporting a handgun, and FIG. 12 shows a revolver 153 being supported at the barrel by support 37 and at the grip by support 39. To accommodate the short length of revolver 153, tube 21 is retracted into tube 19, and supports 37, 39 are positioned close together on tubes 19, 21.

Figure 13:
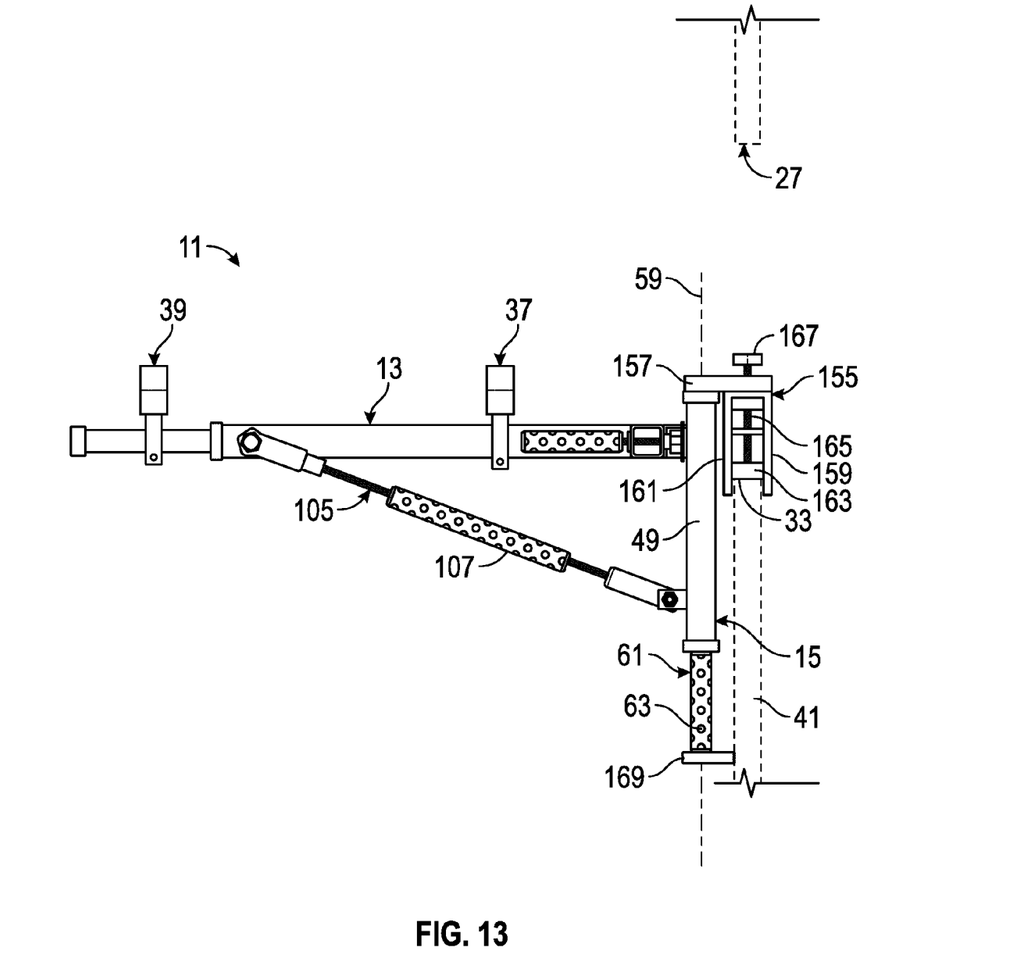
FIG. 13 is a side view of the rest of FIG. 1, the rest being shown in an alternative vertical orientation and configuration.

FIG. 13 shows another configuration for mounting rest 11 to wall 41 adjacent window 27. Rest 11 is configured for use in the vertical orientation, as shown in FIGS. 6 through 8 and described above, but in FIG. 13 rest 11 is rotated 180 degrees, so that tube 49 of pivot member 15 extends downward and below window 27. A mounting element, such as mount 155, engages bottom side 33 of window 27 for supporting rest 11 adjacent wall 41. Mount 155 comprises a generally horizontal upper plate 157 and two side plates 159, 161 extending downward from plate 157. In the embodiment shown, plates 159, 161 are preferably formed as integral with plate 157, though in other embodiments plates 159, 161 can be formed as separate pieces and can comprise an adjustable clamp, allowing for use on walls 41 having different thicknesses. Side plates 159, 161 are oriented to be adjacent interior and exterior sides of wall 41 when mount 155 is installed on wall 41 by simply sliding mount 155 onto wall 41 from above. As shown, mount 155 also includes a height adjuster, comprising a block 163 rotatably coupled to a threaded rod 165 that can be rotated by knob 167 to alter the distance of block 163 from upper plate 157, thereby altering the height of elongate member 13 relative to wall 41. Upper plate 157 is rotatably coupled to tube 49, and a second mounting element, wall adapter 169, is also rotatably coupled to tube 49 through turnbuckle 61. Wall adapter 169 is preferably formed from a resilient material, and the distance of wall adapter 169 from tube 49 can be adjusted using coupling nut 63 of turnbuckle 61. Upper plate 157 and wall adapter 169 cooperate to allow rotation of pivot member 15 and elongate member 13 together relative to mount 155 and wall adapter 169 about pivot axis 59. As described above, the elevation angle of elongate member 13 can be adjusted by rotating coupling nut 107 of link 105.

The particular embodiments disclosed are illustrative only, as the subject matter may be modified and practiced in different but equivalent manners apparent to those skilled in the art having the benefit of the teachings herein. Modifications, additions, or omissions may be made without departing from the scope of this disclosure. For example, though the embodiments shown have nonintersecting pivot axes 59, 95, it should be noted that alternative embodiments may be configured to have intersecting pivot axes 59, 95.

What is claimed is:

1. An apparatus for supporting a firearm in a shooting position adjacent two opposing surfaces facing each other, the apparatus comprising:
   a pivot member;
   an elongate member having a longitudinal length, a forward portion of the elongate member being pivotably coupled to the pivot member to allow pivoting of the elongate member relative to the pivot member about a first pivot axis, the first pivot axis being generally perpendicular to the longitudinal length;
   two mounting elements configured for engaging a pair of opposing surfaces facing each other, the pivot member being pivotably coupled to each mounting element to define a second pivot axis and allow pivoting of the pivot member and elongate member together relative to the mounting elements about the second pivot axis, the second pivot axis being generally perpendicular to the first pivot axis and to the longitudinal length, the mounting elements being configured for engaging the opposing surfaces when a distance between the mounting elements is increased;
   a stop for selectively limiting pivoting of the elongate member about one of the pivot axes; and
   at least one firearm support coupled to the elongate member;
   wherein during use one of the pivot axes is generally horizontal, and the stop is configured during use to constrain pivoting of the elongate member about the generally horizontal pivot axis for defining an elevation angle of the elongate member.

2. The apparatus of claim 1, further comprising:
   a second stop for selectively limiting pivoting of the elongate member about the other of the pivot axes.

3. The apparatus of claim 1, wherein the stop is adjustable for selectively altering the elevation angle.

4. The apparatus of claim 1, wherein the pivot axes are offset from each other.

5. The apparatus of claim 1, wherein the pivot axes intersect each other.

6. The apparatus of claim 1, wherein each mounting element is configured for engaging opposing surfaces of a window frame.

7. The apparatus of claim 1, wherein the distance of at least one of the mounting elements from the pivot member is selectively adjustable.

8. The apparatus of claim 1, wherein the mounting elements are configured to engage opposing surfaces horizontally spaced from each other.

9. The apparatus of claim 1, wherein the mounting elements are configured to engage opposing surfaces vertically spaced from each other.

10. The apparatus of claim 1, wherein at least one of the mounting elements comprises a U-shaped channel.

11. The apparatus of claim 1, wherein at least one of the mounting elements comprises at least one protrusion configured for anchoring the associated element in a compressible material of one of the opposing surfaces.

12. The apparatus of claim 1, further comprising:
a device support configured to support a non-firearm device.

13. The apparatus of claim 1, wherein the elongate member is selectively adjustable for altering the longitudinal length.

14. The apparatus of claim 1, wherein the apparatus is capable of being configured for use with either of the pivot axes oriented as the generally horizontal pivot axis, and the elongate member is allowed to pivot about the other pivot axis.

15. An apparatus for supporting a firearm in a shooting position adjacent a window of a wall, the apparatus comprising:
a pivot member;
an elongate member having a longitudinal length, a forward portion of the elongate member being pivotably coupled to the pivot member to allow pivoting of the elongate member relative to the pivot member about a first pivot axis, the first pivot axis being generally perpendicular to the longitudinal length;
mounting elements configured for engaging opposing inside surfaces of the window, the pivot member being pivotably coupled to the mounting elements to define a second pivot axis and allow pivoting of the pivot member and elongate member together relative to the mounting elements about the second pivot axis, the second pivot axis being generally perpendicular to the first pivot axis and to the longitudinal length, the mounting elements being configured for engaging the opposing inside surfaces when a distance between the mounting elements is increased;
a stop for selectively limiting pivoting of the elongate member about one of the pivot axes; and
at least one firearm support coupled to the elongate member;
wherein during use one of the pivot axes is generally horizontal, and the stop is configured during use to constrain pivoting of the elongate member about the generally horizontal pivot axis for defining an elevation angle of the elongate member.

16. The apparatus of claim 15, further comprising:
a second stop for selectively limiting pivoting of the elongate member about the other of the pivot axes.

17. The apparatus of claim 15, wherein the stop is adjustable for selectively altering the elevation angle.

18. An apparatus for supporting a firearm in a shooting position adjacent a window of a wall, the apparatus comprising:
a pivot member;
an elongate member having a longitudinal length, a forward portion of the elongate member being pivotably coupled to the pivot member to allow pivoting of the elongate member relative to the pivot member about a first pivot axis, the first pivot axis being generally perpendicular to the longitudinal length;
mounting elements configured for engaging opposing inside surfaces of the window, the pivot member being pivotably coupled to the mounting elements to define a second pivot axis and allow pivoting of the pivot member and elongate member together relative to the mounting elements about the second pivot axis, the second pivot axis being generally perpendicular to the first pivot axis and to the longitudinal length, the mounting elements being configured for engaging the opposing inside surfaces when a distance between the mounting elements is increased;
a stop for selectively limiting pivoting of the elongate member about one of the pivot axes; and
at least one firearm support coupled to the elongate member;
wherein during use one of the pivot axes is generally horizontal, and the stop is configured during use to constrain pivoting of the elongate member about the generally horizontal pivot axis for defining an elevation angle of the elongate member; and
wherein the apparatus is capable of being configured for use with either of the pivot axes oriented as the generally horizontal pivot axis, and the elongate member is allowed to pivot about the other pivot axis.

19. The apparatus of claim 18, further comprising:
a second stop for selectively limiting pivoting of the elongate member about the other of the pivot axes.

20. The apparatus of claim 18, wherein the stop is adjustable for selectively altering the elevation angle.

* * * * *